United States Patent
Mattson

(10) Patent No.: US 6,847,136 B2
(45) Date of Patent: Jan. 25, 2005

(54) VIBRATION ISOLATION SYSTEM FOR GARAGE DOOR OPENER

(75) Inventor: Mark C. Mattson, Oceanside, CA (US)

(73) Assignee: Linear Corporation, Carlsbad, CA (US)

(*) Notice: Subject to any disclaimer, the term of this patent is extended or adjusted under 35 U.S.C. 154(b) by 0 days.

(21) Appl. No.: 10/397,119

(22) Filed: Mar. 26, 2003

(65) Prior Publication Data

US 2004/0189107 A1 Sep. 30, 2004

(51) Int. Cl.[7] .............................................. H02K 5/24
(52) U.S. Cl. ........................................ 310/51; 310/91
(58) Field of Search ...................... 310/51, 91; 248/638

(56) References Cited

U.S. PATENT DOCUMENTS

| | | | | |
|---|---|---|---|---|
| 1,834,450 A | * | 12/1931 | Flintermann | 267/141.7 |
| 2,188,807 A | * | 1/1940 | Castricone | 248/610 |
| 3,154,704 A | * | 10/1964 | Shaffer | 310/51 |
| 3,270,221 A | * | 8/1966 | Shaffer | 310/51 |
| 3,941,339 A | * | 3/1976 | McCarty | 248/603 |
| 4,047,588 A | * | 9/1977 | Blass | 180/291 |
| 4,362,840 A | * | 12/1982 | Tabar et al. | 524/525 |
| 4,602,176 A | * | 7/1986 | Baker | 310/51 |
| 5,020,767 A | * | 6/1991 | Ueda et al. | 248/638 |
| 5,040,764 A | * | 8/1991 | Dubois | 248/635 |
| 6,045,112 A | * | 4/2000 | Kirkwood | 248/634 |
| 6,278,209 B1 | * | 8/2001 | Rupp et al. | 310/91 |

* cited by examiner

*Primary Examiner*—Burton Mullins
(74) *Attorney, Agent, or Firm*—Hogan & Hartson, LLP

(57) ABSTRACT

A drive assembly in a motorized door opener includes a motor that is mounted on a mounting structure. At least one vibration isolator is provided between the motor and the mounting structure. The vibration isolator includes a first mounting fastener configured to be mounted to a mounting fastener on the motor, a second mounting fastener configured to be mounted to the mounting structure to mount the motor on the mounting structure, and an elastomeric material between the first and second mounting fasteners. The elastomeric material lies between the first and second mounting fasteners so that the isolator's two mounting fasteners are not in physical contact.

26 Claims, 2 Drawing Sheets

VIBRATION ISOLATION SYSTEM FOR GARAGE DOOR OPENER

BACKGROUND OF THE INVENTION

The invention relates to motorized door opening systems such as those that use an electrical motor that drives a gear system or some sort of linkage to open and close a garage door in a residence or another structure.

Motorized garage door opening systems are well-known and in wide use. Such systems often include an electric motor connected to a gear system, which is connected in turn to a chain, belt, or screw that is linked to the garage door. Driving the motor in one direction opens the door; driving it in the other direction closes the door.

Such systems are popular and convenient because they spare the user the physical effort of opening and closing the door, and when used with a remote control system, the user can open and close the door without leaving his or her vehicle. Some such systems are less than ideal, though, because the electrical motor necessarily produces a certain degree of noise and vibration, and these can be transmitted to the structure to which the motor is mounted. Vibration can also be transmitted to the unit's cover, and radiated from the cover into the surrounding environment. These noises can travel into the interior of the structure, which can disturb others inside the building. Efforts have been made to make the motors and their associated gears and linkages as quiet and smoothly operating as possible, but in many cases more could be done.

It would be desirable, therefore, to devise a system for isolating a drive motor in a door opening system from the structure to which the motor is mounted. Such a system should effectively isolate the motor to decrease the noise and vibration transmitted from the motor to the mounting structure. Such a system should also be simple and inexpensive to manufacture, install, and maintain, so as not to interfere unduly with the system's ease of installation and use. The invention provides such an isolation system—one that offers these and other advantages that will be appreciated more fully with reference to the following written description and the drawings that accompany it.

SUMMARY OF THE INVENTION

The invention is embodied in a drive assembly in a motorized door opener for use especially with an overhead door for a residential or commercial garage. The drive assembly includes a motor that is mounted on a mounting structure. At least one vibration isolator is provided between the motor and the mounting structure. The vibration isolator includes a first mounting fastener configured to be mounted to a mounting fastener on the motor, a second mounting fastener configured to be mounted to the mounting structure to mount the motor on the mounting structure, and an elastomeric material between the first and second mounting fasteners. The elastomeric material lies between the first and second mounting fasteners so that the two mounting fasteners are not in physical contact.

In a particularly preferred embodiment, the motor may be delivered to an assembly site with nuts preinstalled on mounting screws the extend from the motor's housing. The nuts on the motor have threads compatible with mounting screws on the vibration isolator, and the vibration isolator has embedded mounting nuts with threads compatible with the motor's own mounting screws. To install such a motor on a mounting structure, the installer first removes the nuts from the motor's mounting screws, and installs the vibration isolators in their place. The installer fits the vibration isolator's mounting screws to holes provided in the mounting structure, and then screws the nuts onto the isolators' mounting screws to mount the motor onto the mounting structure with the isolators between the motor and the mounting structure.

DESCRIPTION OF THE PREFERRED EMBODIMENTS

Figure 1:
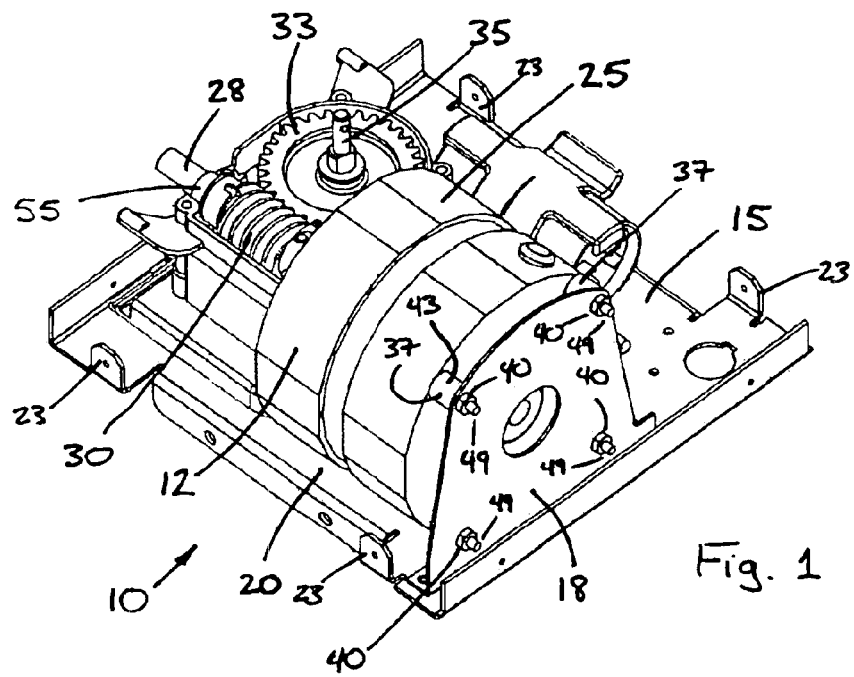
FIG. 1 is a perspective view showing an assembly used as a drive element in system that embodies the invention, with a cover removed for clarity.

The invention is described here in connection with a garage door opener that includes an electrical motor configured to open and close a garage door. FIG. 1 depicts the major portions of a door opener system's "operator" 10, the unit that houses the electrical motor 12 that drives the linkage to open and close the door.

The motor 12 is secured to a mounting structure 15, which in this embodiment includes a vertical mounting plate 18. The mounting plate is mounted in turn to a horizontal mounting tray 20, with the motor suspended on the mounting plate with respect to the mounting tray. A cover, which is omitted from this figure for clarity, mounts to four cover mounting points 23 so that the motor is enclosed inside a cover assembly comprising the mounting tray 20 and the cover.

The motor 12 includes a motor housing 25, which is generally cylindrical in this embodiment. A motor shaft 28 extends out of the motor housing on one side of the motor, with a worm gear 30 mounted on the rotating motor shaft. The worm gear meshes with a spur gear 33. Together, the worm gear 30 and the spur gear 33 form a worm gear set. The spur gear drives a gear shaft 35, which extends through the mounting tray 20 of the operator's housing, as can be seen in the side view of the system shown here as FIG. 2, again with the external cover omitted from the drawing for clarity.

The operator 10 is mounted to the building structure, generally by hanging the operator on a bracket or some similar member mounted securely to the structure of the building. The gear shaft 35 is connected to a drive train, which typically includes a belt, chain, or screw that is connected in turn to a linkage mounted on the movable door. Driving the motor 12 in one direction moves the belt or chain to open the door; driving the motor in the other direction closes the door. This much of the system is generally conventional, and such systems and variants will be familiar to those of skill in the art.

The motor 12 is mounted to the mounting plate 18 via four vibration isolators 37. Two of these isolators are visible in FIG. 1; the other two are implied by the four nuts 40, which secure the motor to the mounting plate 18 with the motor suspended from the mounting plate and the motor shaft 28 substantially perpendicular to the plate.

Figure 2:
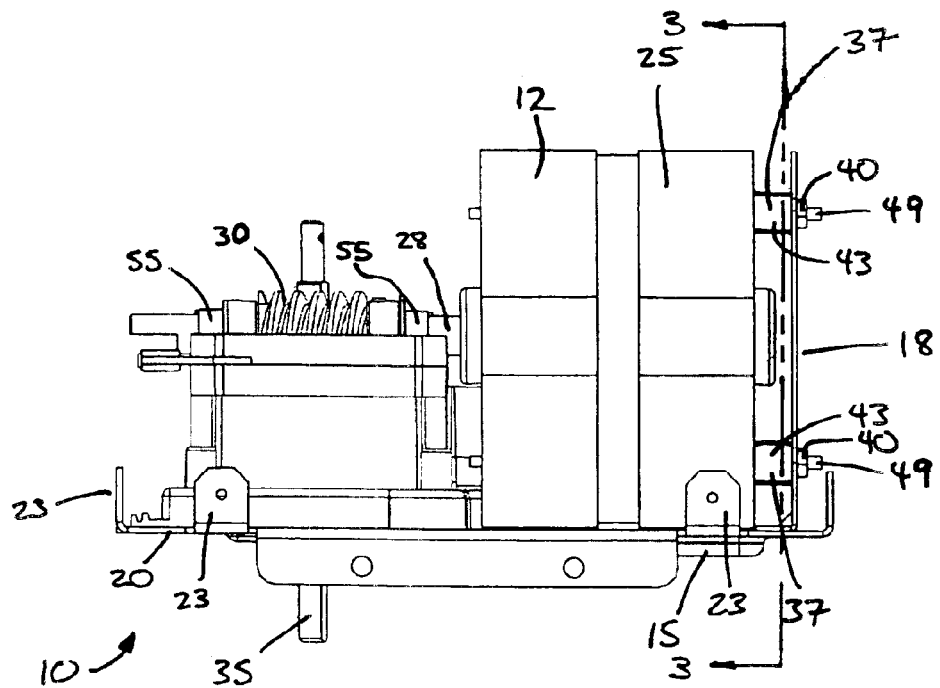
FIG. 2 is a side view of the assembly shown in FIG. 1.
Figure 3:
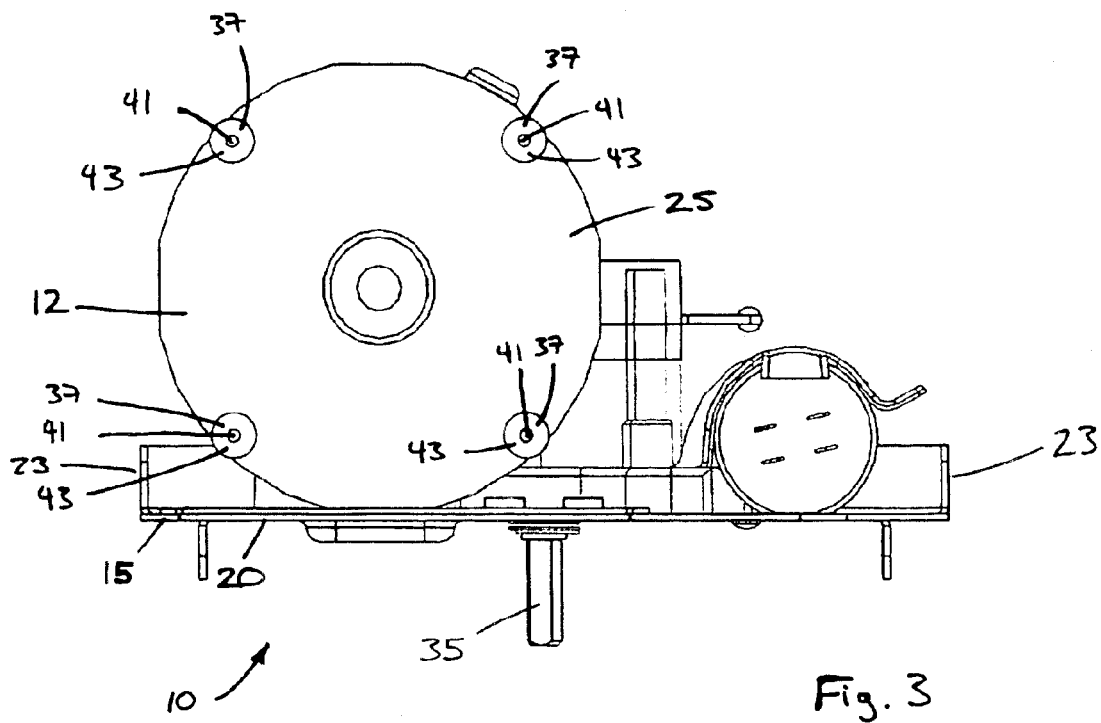
FIG. 3 is a section view of the assembly, taken through section lines 3—3 of FIG. 2.

FIG. 3 is a section view taken through the four vibration isolators 37, generally along the section line 3—3 of FIG. 2 and viewed in the direction of the motor housing 25 at the end of the motor housing opposite of that through which the motor shaft 28 (see. FIG. 1) extends.

As FIG. 3 illustrates, four motor mounting screws 41 protrude from the motor housing 25. The vibration isolators 37 mount to these mounting screws between the motor housing and the vertical mounting plate 18 (see FIG. 2).

Figure 4:
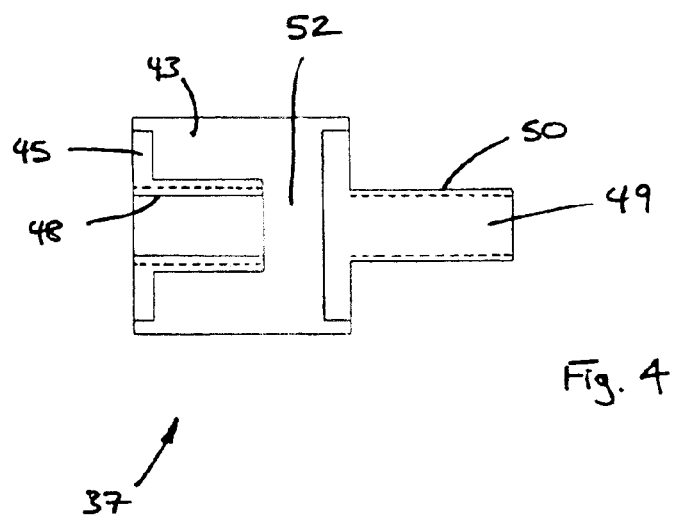
FIG. 4 is a side-section view of a vibration isolator used in the assembly shown in FIGS. 1–3.

FIG. 4 is a section view illustrating the internal structure of a single one of the vibration isolators 37. The vibration isolator includes a central elastomeric material 43 that is selected and configured as an effective isolator of vibration and noise from the motor. The elastomer is formed as a generally cylindrical structure with an embedded nut 45 included in it at one end, the end closest to the motor housing in the completed assembly. The elastomer can be a natural rubber or a synthetic equivalent, and the nut can be a zinc-plated mild steel nut embedded in the elastomer. When the right materials are selected, the elastomeric material bonds with the nut, which helps to secure the nut inside the elastomer. Scuffing the nut before embedding it in the elastomer can enhance the bond between the elastomer and the nut. The embedded nut 45 is provided with internal threads 48 that screw onto the motor mounting screws 41 that extend from the motor housing 25 (see FIG. 3).

The other end of each vibration isolator 37 includes an isolator mounting screw 49, which is provided with external threads 50 where the isolator mounting screw extends out of the elastomer 43. The embedded nut 45 and the isolator mounting screw 49 are both embedded in the elastomer 43, with a central region 52 of the elastomer between them so that the embedded nut and the isolator mounting screw are separated somewhat by the elastomer and not in direct physical contact with one another.

To install the motor 12 onto the mounting plate 18 of the mounting structure 15, the embedded nuts 45 of the vibration isolators 37 are screwed onto the motor mounting screws 41 that project from the motor housing 25. The vibration isolator's mounting screws 49 are inserted through holes provided in the mounting plate, and the nuts 40 are then tightened onto the threads of the vibration isolator's mounting screws to mount the motor onto the mounting plate.

The nuts 40 may be present on the motor mounting screws 41 of the motor 12 before the motor is installed in the drive assembly. In that case, the motor mounting screws 41 will have the same style threads as the isolator mounting screws 49, and the nuts 40 will have the same style threads as the embedded nuts 45 in the isolators 37.

Before installing the isolators 37, the user will first remove the nuts 40 from the motor's mounting screws 41. The nuts 40 will be set aside for the moment, and the isolators' embedded nuts 45 screwed onto the mounting screws 41 of the motor 12. The isolators' mounting screws 49 can then be inserted through the holes in the mounting plate 18, and the nuts 40 retrieved and screwed onto the isolator mounting screws to secure the motor to the mounting structure 15.

The elastomeric material may be natural rubber or a synthetic equivalent such as neoprene or silicone. The elastomer may generally have a hardness somewhere in the range of about 30 to about 55 Durometer (Shore A), preferably between about 40 and about 50 Durometer (Shore A), with the hardness and geometry selected to provide adequate rigidity for a secure motor mount, combined with acceptable isolation of the motor from the mounting structure and adequate damping of noise and vibration.

Such an assembly includes at least one vibration isolator between the motor housing and the mounting structure. Two vibration isolators spaced apart from one another are better, three are better still, and four are used in the preferred embodiment described in this document.

The material and configuration of the isolators should be selected to provide effective isolation and damping of the vibration and noise produced by the motor. In general, softer materials will provide better isolation than stiffer ones. It is important, though, to avoid resonance in the system by configuring the system so that the system's natural frequency is not near the driving frequency of the motor.

Springs—coil springs, leaf springs, or other flexible members—could be used as vibration isolators instead of the elastomeric materials described above. Virtually any type of flexible or deformable material might be configured to isolate the motor's vibration from the structure it is mounted to. Elastomeric isolators are advantageous, though, in that they can provide a significant degree of energy absorption, or damping, as well.

In an assembly of the type described in this document, bearing members may be used around the motor shaft 28. In a prototype embodying the invention, it has been found helpful to include bushings 55 (see FIG. 2) of slightly different internal diameters at each end of the shaft. In the prototype, the motor shaft has a nominal external diameter of 0.5 inches with a specified manufacturing tolerance of between −0.002 and −0.007 inches, so that the actual external diameter of the shaft is within the range between 0.4993 and 0.4998 inches. It has been found useful to include a bushing at the end of the motor shaft away from the motor housing with an internal diameter of 0.501 inches ±0.001 inches (so that the inside diameter of the bushing at the end away from the motor is in the range between 0.500 and 0.502 inches), and a bushing at the end of the motor shaft closer to the motor housing with an internal diameter of 0.504 inches ±0.001 inches (so that the inside diameter of the bushing at the end of the shaft closer to the motor is in the range between 0.503 and 0.505 inches). The slightly greater clearance at the bushing closer to the motor housing is thought to be advantageous in allowing a certain amount of freedom of movement for the motor housing as noise and vibration are absorbed and damped within the vibration isolators between the motor housing and the mounting plate.

Various modifications and additions to the preferred embodiment described in this document will occur to those of skill in the art. The scope of the invention is not limited to the details of this preferred embodiment. The scope of the invention should be determined instead primarily by reference to the appended claims, along with the full scope of equivalents to which those claims are legally entitled.

What is claimed is:

1. A vibration isolator for use in a drive assembly for a movable door, the drive assembly including a drive motor, the vibration isolator comprising:

a first mounting fastener configured for mounting to a mounting fastener on the exterior of the motor to secure the vibration isolator to the motor, wherein the first mounting fastener is an internally threaded nut;

a second mounting fastener configured for mounting to a mounting structure to mount the motor on the mounting structure; and an elastomeric material between the isolator's first and second mounting fasteners, wherein the isolator's first and second mounting fasteners are not in physical contact with one another.

2. The vibration isolator of claim 1, wherein the internally threaded nut of the vibration isolator is at least partially embedded in the isolator's elastomeric material.

3. The vibration isolator of claim 1, wherein the vibration isolator's second mounting fastener is an externally threaded mounting screw.

4. The vibration isolator of claim 1, wherein the elastomeric material is a natural rubber.

5. The vibration isolator of claim 1, wherein the elastomeric material is a synthetic material.

6. The vibration isolator of claim 1, wherein the elastomeric material has a hardness between about 30 and about 55 Durometer (Shore A).

7. The vibration isolator of claim 6, wherein the elastomeric material has a hardness between about 40 and about 50 Durometer (Shore A).

8. A vibration isolator for use in a drive assembly for a movable door, the drive assembly including a drive motor, the vibration isolator comprising:
   a first mounting fastener configured for mounting to a mounting fastener on the exterior of the motor to secure the vibration isolator to the motor, wherein the mounting fastener on the exterior of the motor is an externally threaded mounting screw;
   a second mounting fastener configured for mounting to a mounting structure to mount the motor on the mounting structure, wherein the second mounting fastener is an externally threaded mounting screw having threads of the same type as the threads of the externally threaded mounting screw on the exterior of the motor; and
   an elastomeric material between the isolator's first and second mounting fasteners, wherein the isolator's first and second mounting fasteners are not in physical contact with one another.

9. A drive assembly for a movable door, the assembly comprising:
   a motor including a rotating motor shaft configured to drive the movable door, the motor having a motor housing, the motor shaft exiting the motor housing on a first side of the motor;
   at least one mounting fastener joined to the motor housing on a second side of the motor generally opposite the first side;
   at least one vibration isolator configured to be secured to the motor's mounting fastener, the vibration isolator comprising:
      a first mounting fastener configured for mounting to the motor's mounting fastener to secure the vibration isolator to the motor;
      a second mounting fastener; and
      an elastomeric material between the isolator's first and second mounting fasteners, wherein the isolator's first and second mounting fasteners are not in physical contact with one another; and
   a mounting structure configured to receive the vibration isolator's second mounting fastener to mount the motor onto the mounting structure with the vibration isolator's elastomeric material between the motor housing and the mounting structure.

10. The drive assembly of claim 9, wherein the mounting structure is a vertical mounting plate substantially perpendicular to the axis of the motor's shaft.

11. The drive assembly of claim 9, wherein the drive assembly comprises:
   at least two vibration isolators configured to be secured to mounting fasteners secured to the motor's housing, each of the vibration isolators comprising:
      a first mounting fastener configured for mounting to the motor's mounting fastener to secure the vibration isolator to the motor;
      a second mounting fastener; and
      an elastomeric material between the isolator's first and second mounting fasteners, wherein the isolator's first and second mounting fasteners are not in physical contact with one another.

12. The drive assembly of claim 11, wherein the drive assembly comprises:
   at least three vibration isolators configured to be secured to mounting fasteners secured to the motor's housing, each of the vibration isolators comprising:
      a first mounting fastener configured for mounting to the motor's mounting fastener to secure the vibration isolator to the motor;
      a second mounting fastener; and
      an elastomeric material between the isolator's first and second mounting fasteners, wherein the isolator's first and second mounting fasteners are not in physical contact with one another.

13. The drive assembly of claim 12, wherein the drive assembly comprises:
   at least four vibration isolators configured to be secured to mounting fasteners secured to the motor's housing, each of the vibration isolators comprising:
      a first mounting fastener configured for mounting to the motor's mounting fastener to secure the vibration isolator to the motor;
      a second mounting fastener; and
      an elastomeric material between the isolator's first and second mounting fasteners, wherein the isolator's first and second mounting fasteners are not in physical contact with one another.

14. The drive assembly of claim 9, wherein the mounting fastener joined to the motor housing is an externally threaded mounting screw.

15. The drive assembly of claim 9, wherein the vibration isolator's first mounting fastener is an internally threaded nut.

16. The drive assembly of claim 15, wherein the internally threaded nut of the vibration isolator is at least partially embedded in the isolator's elastomeric material.

17. The drive assembly of claim 9, wherein the vibration isolator's second mounting fastener is an externally threaded mounting screw.

18. The drive assembly of claim 9, wherein the mounting fastener joined to the motor housing is an externally threaded mounting screw and the second mounting fastener of the vibration isolator is an externally threaded mounting screw having threads of the same type as the threads of the externally threaded mounting screw joined to the motor housing.

19. The drive assembly of claim 9, wherein the elastomeric material is a natural rubber.

20. The drive assembly of claim 9, wherein the elastomeric material is a synthetic material.

21. The drive assembly of claim 9, wherein the elastomeric material has a hardness between about 30 and about 55 Durometer (Shore A).

22. The drive assembly of claim 21, wherein the elastomeric material has a hardness between about 40 and about 50 Durometer (Shore A).

23. The drive assembly of claim 9, and further comprising a first bearing member disposed about the motor shaft at a first location relatively close to the motor housing and a second bearing member disposed about the motor shaft at a second location relatively far from the motor housing, wherein the first bearing member has a clearance fit around the motor shaft greater than a clearance fit around the motor shaft of the second bearing member.

24. A method for installing a drive motor in a drive assembly for a movable door, the method comprising:

providing the drive motor with at least one threaded motor mounting screw projecting from the exterior of the motor, and a nut threaded onto the motor mounting screw;

removing the nut from the motor mounting screw;

installing a vibration isolator onto the motor mounting screw, the vibration isolator comprising:
- a nut with internal threads compatible with external threads on the motor mounting screw;
- a mounting screw with external threads compatible with internal threads in the nut removed from the motor mounting screw; and
- an elastomeric material between the threaded nut and the mounting screw, wherein the threaded nut and the mounting screw are not in physical contact with one another;

wherein installing the vibration isolator onto the motor mounting screw includes screwing the vibration isolator's threaded nut onto the motor mounting screw;

inserting the vibration isolator's mounting screw through a mounting hole in a mounting structure; and threading the nut removed from the motor mounting screw onto the vibration isolator's mounting screw on a side of the mounting structure opposite the motor to mount the motor on the mounting structure.

25. The method of claim 24, wherein the mounting structure is a vertical mounting plate substantially perpendicular to a shaft extending outward from one side of the drive motor.

26. The method of claim 24, and further comprising:

removing a second nut from a second threaded motor mounting screw projecting from the exterior of the motor;

installing a second vibration isolator onto the second motor mounting screw, the second vibration isolator comprising:
- a nut with internal threads compatible with external threads on the motor mounting screw;
- a mounting screw with external threads compatible with internal threads in the nut removed from the motor mounting screw; and
- an elastomeric material between the threaded nut and the mounting screw, wherein the threaded nut and the mounting screw are not in physical contact with one another;

inserting the second vibration isolator's mounting screw through a second mounting hole in the mounting structure; and threading the nut removed from the second motor mounting screw onto the second vibration isolator's mounting screw on a side of the mounting structure opposite the motor.

* * * * *